United States Patent
Sommazzi et al.

[11] Patent Number: 5,369,073
[45] Date of Patent: Nov. 29, 1994

[54] HOMOGENEOUS CATALYTIC SYSTEM AND PROCESS FOR COPOLYMERIZING OLEFINS WITH CARBON MONOXIDE

[75] Inventors: Anna Sommazzi, Santa Margherita Ligure; Gabriele Lugli, Milan; Fabio Garbassi, Novara; Fausto Calderazzo, Ghezzano, all of Italy

[73] Assignee: Enichem S.p.A., Milan, Italy

[21] Appl. No.: 29,875

[22] Filed: Mar. 11, 1993

[30] Foreign Application Priority Data

Mar. 11, 1992 [IT] Italy ............... MI92A/000553
Dec. 11, 1992 [IT] Italy ............... MI92A/002820

[51] Int. Cl.$^5$ ............... B01J 31/18; B01J 31/28
[52] U.S. Cl. ............... 502/162; 502/165; 502/167
[58] Field of Search ............... 502/162, 167, 165

[56] References Cited

U.S. PATENT DOCUMENTS 3,694,412 9/1972 Nozaki .

FOREIGN PATENT DOCUMENTS 0121965 10/1984 European Pat. Off. .
0222454 5/1987 European Pat. Off. .
0229408 7/1987 European Pat. Off. .
0239145 9/1987 European Pat. Off. .
0245893 11/1987 European Pat. Off. .
0257663 3/1988 European Pat. Off. .
0305012 3/1989 European Pat. Off. .
0343734 11/1989 European Pat. Off. .
1081304 8/1967 United Kingdom .

*Primary Examiner*—Asok Pal
*Attorney, Agent, or Firm*—Rogers & Wells

[57] ABSTRACT

A catalyst active in the preparation of alternating olefin/carbon monoxide (CO) copolymers is constituted by:

(a) at least one salt of a metal of Group IB of the Periodic System,
(b) an either mono- or bidentate ligand containing one or two nitrogen or phosphorus atoms capable of linking to the copper, silver or gold atom by means of dative bonds,
(c) a mineral or organic acid.

Disclosed are the preparation of the catalyst and the use of said catalyst in alternated copolymerization of ethylene (C2) and/or other olefins with carbon monoxide.

12 Claims, No Drawings

HOMOGENEOUS CATALYTIC SYSTEM AND PROCESS FOR COPOLYMERIZING OLEFINS WITH CARBON MONOXIDE

The present invention relates to a homogeneous, catalyst based on copper or gold, to its preparation and to its use in the copolymerization of ethylene (C2) and/or other olefins with carbon monoxide (CO) in order to produce alternated copolymers with regular morphology.

From the prior art, catalytic systems capable of yielding alternating C2/CO polymers are known and widely described. Most of them are catalytic systems based on metals belonging to Group VIII of the Periodic System.

So, for example, U.S. Pat. No. 3,984,388 discloses the use of nickel cyanide as polymerization catalyst for C2/CO mixtures. Other non-patent references [Makromol. Chem., 161, 1741 (1968)] discloses the possible use of cobalt carbonyls.

A large number of patents disclose, on the contrary, the use of catalytic system based on Pd salts, or based on salts of another metal belonging to Group VIII of the Periodic System and containing bidentate ligands capable of binding to the metal atom through dative bonds; such catalytic systems are capable of copolymerizing ethylene (C2) and/or other compounds containing unsaturations of olefinic type with carbon monoxide (CO), yielding alternating copolymers, either in solution or in suspension, and in the presence of a mineral and/or organic acid.

So, for example, in U.K. Patent No. 1,081,304 there is disclosed the solution polymerization of monomeric mixtures of C2 and CO in order to yield alternating copolymers by means of the use of an alkyl phosphinic complex of a Pd salt, and U.S. Pat. No. 3,689,460 claims a catalyst based on a tetrakisphosphinic palladium complex. Analogous catalytic systems are disclosed in U.S. Pat. No. 3,694,412.

Other catalytic systems known from the prior art, capable of yielding alternating C2-CO copolymers, are constituted by: (1) a palladium, nickel or cobalt salt of a preferably carboxy acid, (2) a bidentate base, generally constituted by an alkyl or cycloalkyl hydrocarbon symmetrically substituted with two dialkyl- or diphenyl-phosphinic moieties or with two moieties containing at least one nitrogen atom, and (3) an anion of an acid, preferably an organic acid, with a pKa value of approximately 2. Such catalytic systems are disclosed, e.g., in EP 0 121 965, EP 0 222 454, EP 0 257 663, EP 0 305 012 and make it possible alternating C2/CO polymers to be obtained with good yields.

Some modifications of the above approach consist in adding to the catalytic systems a fourth component selected from compounds belonging to the groups of quinones, organic oxidizers and aromatic nitrocompounds, according to as claimed, e.g., in European Patents EP No. 239 145 and EP No. 245 893, and so forth, or in the use of bidentate bases with both heteroatoms constituted by nitrogen, or mixed heteroatoms P and S, such as disclosed, e.g., in European Patents EP No. 245 893 and EP No. 343 734.

The present Applicant has now unexpectedly found that alternating copolymers of carbon monoxide with an olefin or a mixture of olefins, such as ethylene (C2), propylene, butene and/or higher homologues, can be prepared in the presence of a homogeneous catalyst based on a salt of a metal belonging to Group IB of the Periodic System; such Group comprises copper, silver and gold.

In accordance therewith and according to a first aspect, the present invention relates to a homogeneous catalytic system active in the preparation of alternating copolymers of olefins with carbon monoxide (CO), constituted by:
(a) at least one salt of a metal of Group IB of the Periodic System,
(b) a bidentate chelating base containing two phosphorus or nitrogen atoms, capable of binding to Cu, Ag or Au atoms through dative bonds,
(c) a mineral or organic acid, with the proviso that such an acid shall not be a hydrohalic acid and shall have a pKa value lower than 6.

The present invention relates also, and this is a second aspect of the present invention, to the use of such a catalytic system in the alternating copolymerization of ethylene (C2) and/or other olefins with carbon monoxide (CO).

The copper, silver or gold salts which can be used as the component (a) of the catalytic system of the present invention generally are inorganic, organic or organometallic salts which are soluble in such common organic salts as, e.g., methanol, toluene and dimethoxyethane; the solvents are better detailed in the following. Examples of non-limitative Cu, Ag or Au salts for the purposes of the present invention are trifluoromethanesulfonate, trifluoroacetate, acetate, tosylate, sulfate, chloride, diethylcarbamate and hexafluorophosphate.

The bidentate chelating bases which can be used as the component (b) of the catalytic system of the present invention are compounds which contain two heteroatoms, such as phosphorus or nitrogen atoms capable of linking to the of one of the above cited metals of Group IB atom through dative atoms and correspond to the general formula (I)

$$R_1R_2\text{-}M\text{-}R\text{-}M\text{-}R_3R_4 \qquad (I)$$

in which:
M represents a phosphorus or nitrogen atom,
R stands for a polymethylene radical containing from 2 to 4 carbon atoms, a cycloalkylidene radical containing from 2 to 10 carbon atoms, an orthophenylene radical,
$R_1$, $R_2$, $R_3$, and $R_4$, which are the same or may be different from each other, represent an alkyl radical of from 1 to 6 carbon atoms, a cycloalkyl radical of from 3 to 6 carbon atoms, an aromatic radical of from 6 to 12 carbon atoms, possibly with substituents.

Inasmuch as, the bidentate chelating agent is capable of forming a complex with the metal atom through its two heteroatoms, the total number of atoms which constitute the complex ring should preferably be not higher than 7, that means that the total number of carbon atoms in the polymethylene radical R should preferably not exceed 4; if, on the contrary, R is constituted by a cycloalkylidene radical, the latter will preferably carry both its chelating atoms bound to two adjacent atoms in the ring.

Basing on the above, examples of bidentate chelating bases containing two phosphorus atoms are: 1,3-bis(diphenylphosphino)propane, 1,4-bis(dicyclo-hexylphosphino)butane and 1,2-bis(diphenylphosphino)cyclohexane; other bidentate bases containing two nitrogen atoms, which do not belong to the group of chelating compounds which can be represented by the general formula (I), but which can be used in order to form the catalytic systems of the present invention are 1,10-phenanthroline, 3-methyl-1,10-phenanthroline, 2,2'-bipyridyl and 4,4'-dimethyl-2,2'-bipyridyl.

The component (c) of the catalytic system of the present invention is a mineral or organic acid with no particular requirements as regards its strength (dissociation constant), provided that its pKa is lower than 6; examples of organic or mineral acids useable for the purposes of the present invention are: trifluoroacetic acid, p-toluene sulfonic acid, sulfuric acid, hexafluorophosphoric acid ($HPF_6$), tetrafluoroboric acid ($HBF_4$), or alkane sulfonic acids, which acids may be used either as single compounds, or as mixtures with each other.

The end catalytic system is obtained by adding to a solution of the component (a) in a suitable solvent, the other two components of the catalytic system, i.e., respectively, the component (b), i.e., the bidentate base, and the component (c), i.e., the organic or mineral acid; the addition is carried out at room temperature and under an inert atmosphere (nitrogen). The resulting solution is then ready for use in the synthesis of the alternating polymers.

In the event when, as the component (a) of the homogeneous catalyst a copper salt is used, said catalyst is obtained by adding to a solution of copper acetate $Cu(CH_3COO)_2$ in methanol a bidentate ligand containing two phosphorus atoms, for example, 1,3-bis(diphenylphosphino)propane (DPPP), and than an organic acid, preferably trifluoroacetic, tetrafluoroboric and hexafluoroboric acid.

On the contrary, in the event when as the component (a) of the homogeneous catalyst a silver salt is used, said homogeneous catalyst is obtained by adding to a solution of silver trifluoromethanesulfonate ($CF_3SO_3Ag$) in methanol a bidentate ligand containing two phosphorus atoms, e.g., 1,3bis(diphenylphosphino)propane, and then an organic acid, preferably trifluoroacetic acid.

The molecular ratio of the metal salt to the bidentate ligand to be added to the reaction media may vary within a wide range, even if the preferred ratio is rather close to the stoichiometric values; in the preferred case when the component (b) is constituted by a bis(diphenylphosphino)alkane, such as, e.g., 1,3-bis(diphenylphosphino)propane, such a ratio is generally comprised within the range of from of 1:1 to 1:4 mols of salt:mol of bidentate base; a ratio of 1:1 is anyway preferred.

The molar amount of component (c) is in its turn a function of the type of the acid, and of the amount of component (a). In the preferred case when the component (c) is constituted by trifluoroacetic acid, the latter is added to the reaction media in amounts comprised within the range of from 2 to 40 mols of acid per each mol of metal salt; the molar amount of trifluoroacetic acid preferably is 20 times as large as the amount of metal salt used (expressed as mols).

As the solvents in the reaction of formation of the catalytic complex of the present invention, there may be used the aliphatic or aromatic hydrocarbons, the blends of mixed aromatic-aliphatic solvents, hydroxylated solvents, such as alcohols and glycols, linear or cyclic ethers, such as, e.g., diethylether, dimethoxyethane and tetrahydrofuran; the selection of the most suitable solvent is carried out from time to time by taking into consideration the solubility of the metal salt and of the bidentate compound with no prejudice for the activity of the end catalytic system.

An objective advantage of the present invention resides in that the catalytic system is characterized by a considerable flexibility and requires materials which are easily available from the market and/or can be easily prepared, with a considerable simplification of the production process; in fact, both the copper and silver salts, which constitute the component (a) of the catalytic system according to the present invention, and the bidentate base (b), as well as the acid (c), are relatively cheap products. The preparation of the catalytic system only requires, as said above, simply mixing the components in the selected solvent and adding the mixture to the polymerization reactor.

As an alternative, the preparation of the catalytic system according to the above reported modalities can be directly carried out inside the polymerization reactor and before charging the monomers.

By carrying out the copolymerization of CO with one or more monomers containing olefinic unsaturations and in the presence of the homogeneous catalyst according to the present invention, alternating CO/olefin copolymers are obtained with high yields, as reported in the following examples.

The exact alternation of the copolymer obtained according to the present invention was verified by using a spectroscopic system described in the literature and precisely in "Application of Polymer Spectroscopy" published by Academic Press (1978), at page 19.

The reaction of polymerization of the monomers, i.e., the olefinic component, or the mixture of a plurality of olefins and respectively carbon monoxide, is carried out inside a sealed reactor, previously purged with nitrogen, by adding the solvent, the components of the catalytic system, or a solution of the previously prepared catalytic system, and the monomers; then the polymerization is carried out at a temperature comprised within the range of from 50° to 120° C., under a pressure comprised within the range of from $40*10^5$ to $100*10^5$ Pa and for a polymerization time comprised within the range of from 3 to 9 hours.

The polymerization solvent can be an alcohol, an ether, a hydrocarbon, or a mixture of two or more solvents belonging to the above said categories, and the amount of catalyst, expressed as gram-atoms of Cu per each liter of solvent, is comprised within the range of from $10^{-2}$ to $10^{-5}$ and the other components of the catalytic system, i.e., the component (b) and (c) respectively, are used in the above mentioned molar ratios.

The polymerization reaction is preferably carried out in an alcoholic solvent, containing the catalytic system, with 1:1 molar CO/olefin mixtures, under pressures of $50*10^5$–$60*10^5$ Pa, temperatures comprised within the range of from 70° to 90° C., and for a polymerization time comprised within 3 to 6 hours.

The olefinic monomers, which may be used as single monomers or as mixtures of two or more monomers and together with carbon monoxide are alpha-olefins, such as ethylene, propylene, butene-1, pentene-1, and so forth, cyclopentene and styrene; the preferred monomer is ethylene (C2), and the preferred mixture is ethylene with propylene.

The possibility of being capable of using different olefins, either as a single olefin or simultaneously as olefin blends, in order to produce the copolymers of olefins with carbon monoxide, constitutes a further advantage of the present invention. In such a way, an alternating copolymer can be obtained, the properties of which, such as, e.g., its melting temperature, its glass transition temperature (Tg) and its processability, can be modulated. The general aspects of the instant invention having been disclosed, the following specific examples are supplied now for the only purpose of illustrating some details of the same invention, and shall not be regarded as being in any way limitative thereof.

All the compositions and percent values reported are by weight unless differently specified.

EXAMPLE 1

500 cm$^3$ of methanol are charged to an autoclave of 2 liters of capacity, previously purged with nitrogen. 0.5 mmol of Cu(CH$_3$COO)$_2$, 0.5 mmol of 1,3-bis(diphenylphosphino)propane (DPPP) and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

20 g of copolymer is obtained.

EXAMPLE 2

500 cm$^3$ of methanol are charged to an autoclave of 2 liters of capacity, previously purged with nitrogen. 0.5 mmol of CuCl, 0.5 mmol of 1,3-bis(diphenylphosphino)propane (DPPP) and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

10 g of copolymer is obtained.

EXAMPLE 3

500 cm$^3$ of methanol are charged to an autoclave of 2 liters of capacity, previously purged with nitrogen. 0.5 mmol of Cu(CH$_3$COO)$_2$, 0.5 mmol of 2,2'-bipyridyl and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

3 g of copolymer is obtained.

EXAMPLE 4

500 cm$^3$ of methanol are charged to an autoclave of 2 liters of capacity, previously purged with nitrogen. 0.5 mmol of CuSO$_4$, 0.5 mmol of 1,3-bis(diphenylphosphino)propane (DPPP) and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

6 g of copolymer is obtained.

EXAMPLE 5

500 cm$^3$ of methanol are charged to an autoclave of 2 liters of capacity, previously purged with nitrogen. 0.5 mmol of Cu(O$_2$CNPr$_2$)$_2$, 0.5 mmol of 1,3-bis(diphenylphosphino)propane (DPPP) and 10 mmol of trifluoroacetic acid are added. Then a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

10 g of copolymer is obtained.

EXAMPLE 6

500 cm$^3$ of methanol are charged to an autoclave of 2 liters of capacity, previously purged with nitrogen. 0.5 mmol of Ag(SO$_3$CF$_3$), 0.5 mmol of 1,3-bis(diphenylphosphino)propane (DPPP) and 10 mmol of trifluoroacetic acid are added. Then a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried at a temperature of approximately 60° C. and with a vacuum of 10$^2$ Pa.

8 g of copolymer is obtained.

EXAMPLE 7

A stirred autoclave of 2 liters of capacity, previously purged with nitrogen, is charged with 300 cm$^3$ of methanol and 200 cm$^3$ of toluene, 0.5 mmol of Ag(SO$_3$CF$_3$), 0.5 mmol of 1,10-phenanthroline and 10 mmol of trifluoroacetic acid are added.

Then, a mixture of ethylene/CO in the ratio of 1:1 molar is added until a pressure of 56*10$^5$ Pa is reached. This pressure value is kept constant throughout the reaction time period.

After 5 hours of polymerization at 80° C., the autoclave is cooled down to room temperature and the residual gases are vented.

The polymer suspended in the polymerization solvent is filtered off, the filter cake is washed with methanol, and is dried under vacuum (10$^2$ Pa) in an oven at 60° C.

5 g of product is obtained.

EXAMPLE 8

300 cm$^3$ of methanol and 200 cm$^3$ of toluene are charged to an autoclave of 2 liters of capacity, previously purged with nitrogen. 0.5 mmol of Ag(SO$_3$CF$_3$), 0.5 mmol of 1,3-bis(diphenylphosphino)propane and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried in a vacuum oven (10$^2$ Pa) at 60° C.

10 g of copolymer is obtained.

EXAMPLE 9

500 cm$^3$ of methanol are charged to an autoclave of 2 liters of capacity, previously purged with nitrogen. 0.5 mmol of Ag(CH$_3$COO), 0.5 mmol of 1,3-bis(diphenylphosphino)propane and 10 mmol of trifluoroacetic acid are added. Then, a mixture of ethylene/CO in the ratio of 1:1 molar is added until a pressure of 56*10$^5$ Pa is reached.

After 5 hours of reaction at 80° C., the autoclave is cooled down to room temperature and the residual pressure is vented.

The copolymer is filtered, is washed with methanol, and is dried in a vacuum oven (10$^2$ Pa), at 60° C.

8 g of copolymer is obtained.

We claim:

1. Homogeneous catalytic system active in the preparation of alternating copolymers of olefins with carbon monoxide (CO), constituted by:
   (a) at least one salt of a metal of Group 1B of the Periodic Table,
   (b) a bidentate chelating base containing two phosphorus or nitrogen atoms wherein the chelating base is selected from the group consisting of compounds having the general formula (I)

in which:
   M represents a phosphorus or nitrogen atom,
   R stands for a polymethylene radical containing from 2 to 4 carbon atoms, a cycloalkylidene radical containing from 2 to 10 carbon atoms, or a phenylene radical,
   R$_1$, R$_2$, R$_3$, and R$_4$, which may be the same or different from each other, represent an alkyl radical of from 3 to 6 carbon atoms, a cycloalkyl radical of from 3 to 6 carbon atoms, or an aromatic radical of from 6 to 12 carbon atoms; and
   (c) an organic or mineral acid, with the proviso that it shall not be a hydrohalic acid and shall have a pKa value lower than 6.

2. Catalytic system according to claim 1, characterized in that the anion of the salt of metal of Group IB is selected from the group consisting of trifluoromethanesulfonate, trifluoroacetate, tosylate, acetate, hexafluorophosphate and diethylcarbamate.

3. Catalytic system according to claim 1, characterized in that said chelating base is a compound selected from the group containing 1,3-bis-(diphenylphosphino)propane, 1,4-bis(dicyclohexylphosphino)butane and 1,2-bis(diphenylphosphino)cyclohexane.

4. Catalytic system according to claim 1, characterized in that said chelating base is 2,2'-bipyridyl.

5. Catalytic system according to claim 1, characterized in that said chelating base is 4,4'-dimethyl-2,2'-bipyridyl.

6. Catalytic system according to claim 1, characterized in that said chelating base is selected from the group of 1,10-phenanthroline and 3-methyl-1,10-phenanthroline.

7. Catalytic system according to claim 1, characterized in that the component (c) of the homogeneous catalytic system is trifluoroacetic acid.

8. Process for preparing a catalytic system, said process comprising:
   (i) dissolving a salt of a metal of Group IB of the Periodic Table in a suitable solvent,
   (ii) adding a mono-or bidentate ligand base to the resulting solution, and
   (iii) adding a mineral or organic acid to the resulting solution.

9. Process according to claim 8, characterized in that an amount of ligand base (b) is added in step (ii) such that the molar ratio of the metal salt to the ligand base is within the range of from 1:1 to 1:4.

10. Process according to claim 8, characterized in that an amount of mineral or organic acid (c) is added in step (iii) such that the molar ratio of the mineral or organic acid to the salt of metal of Group IB is within the range of from 2 to 40.

11. A process according to claim 9 wherein the molar ratio of the metal salt to the ligand base is 1.

12. A process according to claim 10 wherein the molar ratio of mineral or organic acid to the metal salt is 20.

* * * * *